(12) United States Patent
Rothkopf

(10) Patent No.: US 8,571,487 B2
(45) Date of Patent: Oct. 29, 2013

(54) NETWORK STATUS

(75) Inventor: Fletcher Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 12/965,489

(22) Filed: Dec. 10, 2010

(65) Prior Publication Data

US 2012/0149308 A1 Jun. 14, 2012

(51) Int. Cl.
*H04B 17/00* (2006.01)

(52) U.S. Cl.
USPC ........ 455/67.7; 455/552.1; 709/224; 709/228

(58) Field of Classification Search
USPC .................. 455/67.7, 552.1; 709/224, 228
See application file for complete search history.

(56) References Cited

U.S. PATENT DOCUMENTS

| | | | |
|---|---|---|---|
| 6,728,349 B2 | 4/2004 | Chang et al. | |
| 6,842,622 B2 | 1/2005 | Peters et al. | |
| 7,190,351 B1 | 3/2007 | Goren | |
| 7,233,229 B2 | 6/2007 | Stroupe et al. | |
| 7,263,351 B2 * | 8/2007 | Ross et al. | 455/419 |
| 7,315,614 B2 | 1/2008 | Bedingfield, Jr. et al. | |
| 7,362,854 B2 | 4/2008 | McKnight | |
| 7,551,586 B1 | 6/2009 | Yew et al. | |
| 7,630,724 B2 * | 12/2009 | Beyer et al. | 455/457 |
| 2001/0029194 A1 | 10/2001 | Ketola et al. | |
| 2006/0229107 A1 | 10/2006 | Cho et al. | |
| 2007/0253339 A1 | 11/2007 | Ovadia et al. | |
| 2008/0039152 A1 | 2/2008 | Arisawa | |
| 2008/0049675 A1 * | 2/2008 | Burgan et al. | 370/331 |
| 2009/0028179 A1 | 1/2009 | Albal | |
| 2009/0175183 A1 | 7/2009 | Mochizuki et al. | |
| 2010/0178919 A1 | 7/2010 | Deepak et al. | |
| 2010/0203904 A1 | 8/2010 | Khokhlov | |
| 2011/0051642 A1 | 3/2011 | Krishnaswamy | |
| 2011/0055363 A1 | 3/2011 | Kanno et al. | |
| 2011/0076989 A1 | 3/2011 | Lynch | |
| 2011/0085549 A1 | 4/2011 | DiMambro | |
| 2011/0185202 A1 * | 7/2011 | Black et al. | 713/320 |
| 2011/0244870 A1 | 10/2011 | Lee | |
| 2011/0310982 A1 | 12/2011 | DiMambro | |

FOREIGN PATENT DOCUMENTS

| | | |
|---|---|---|
| EP | 1071295 | 1/2001 |
| EP | 2148531 | 1/2010 |
| WO | 2009/035243 A2 | 3/2009 |
| WO | 2011075151 A1 | 6/2011 |

OTHER PUBLICATIONS

Evans, Joel, "Review of Samsung Instinct," geek.com, 23 pages, Jul. 8, 2008.

* cited by examiner

*Primary Examiner* — Tuan H Nguyen
(74) *Attorney, Agent, or Firm* — Meyertons, Hood, Kivlin, Kowert & Goetzel, P.C.

(57) ABSTRACT

There are provided systems and methods for providing a network status to facilitate communications. In particular, in some embodiments, a method of operating an electronic communication device is provided that includes retrieving a network status of another communication device. The network status comprises a signal strength. An available communication mode is determined based on the network status and a recommended communication mode is provided to a user based at least in part upon the retrieved network status.

21 Claims, 8 Drawing Sheets

NETWORK STATUS

TECHNICAL FIELD

The present disclosure relates to wireless communications and, more particularly, to devices and systems related to determining a network status within a wireless communication system.

BACKGROUND

With continually improving wireless technologies, the proliferation of wireless communication is expected to continue for the foreseeable future. Wireless technologies allow users to communicate in a variety of different modes and across various different networks without the mobility constraints that are inherent with wired devices.

Wired and wireless device are increasingly interconnected and compatible. As such, wireless communications are not limited to wireless devices, nor are wired communications limited to wired devices. Indeed, many of the types of communications may be shared between the two. In particular, wired and wireless device may be capable of Internet based communications, telephonic communications, and text based communications.

Wireless communications, however, are not always reliable. Indeed, in some geographic areas, wireless cellular communication may be difficult or even impossible. This may be due to one or more different factors. For example, in remote areas, there may not be wireless services provided or accessible and in some areas there may be insufficient cellular antenna and bandwidth coverage for the amount of wireless traffic that is experienced. As such, a user of a wireless device may be unable to complete or carryout communications using certain modes of communications. This can be a frustrating ordeal on both ends of a communication. Specifically, the communications may be unable to initiate or, even if they are initiated, they may be choppy, indiscernible and may fail midstream (e.g., dropped calls).

SUMMARY

A system and related methods are provided to indicate network status of devices. The network status may include an indication of signal strength and a mode of communication. For example, a network status may indicate that a wireless device is on a 3G network and has three bars, or that the device does not currently have access to cellular service.

In some embodiments, the system may be configured to evaluate the network status of devices and provide a recommended mode of communication to a user. For example, if a wireless device has two or fewer bars, a text based communication may be recommended, rather than a telephone call. As such, the system may provide intelligent suggestions to users to help facilitate communications.

In some embodiments, a wireless device may be configured to provide a particular network status that does not necessarily reflect its network status. Specifically, in some embodiments, the device may be configured to indicate to a certain contact that the device is unavailable for certain modes of communication.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Figure 1:
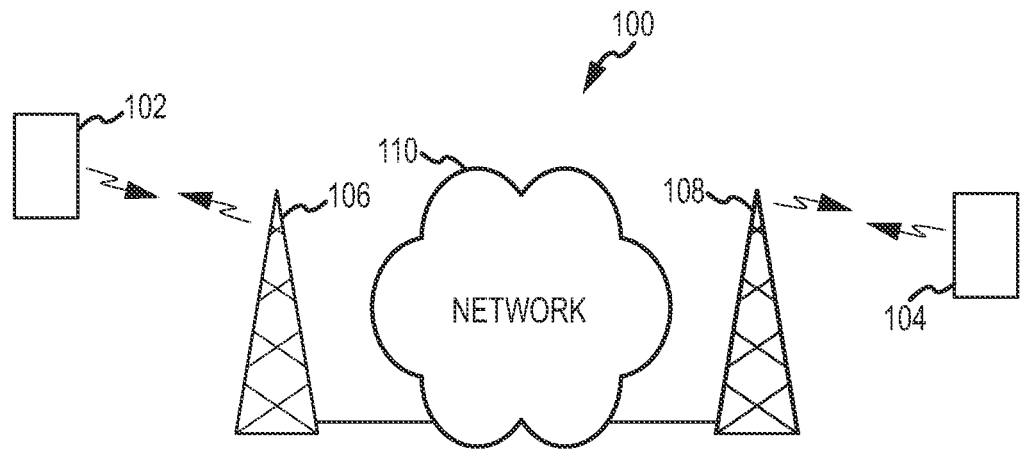
FIG. 1 illustrates an example wireless network for communications between wireless devices.

A wireless communication system that provides a network status of people with whom wireless communications may be carried out is provided in some embodiments. In particular, the network status may include providing an indication of a signal strength of a first user's device to a second user's device. The signal strength may be indicated by a number of bars, a percentage, a fraction or any suitable graphical, numerical or other symbol. In some embodiments, the network strength may additionally or alternatively indicate a type of network available to the first device for communications. For example, in some embodiments, the second device may display or indicate to the second user that the first device is currently able to communicate over a WiFi network, a 3G cellular network, a 4G network, an Edge network, or other available network. Accordingly, as used herein, the terms "status," and "network status" may refer to a strength of signal and/or a type of network currently available for communications by a particular device.

In some embodiments, the a device may be configured to provide a recommended mode of communications based on the determined network status of the another user's device. That is, the second device may be configured to suggest text based, voice based, or Internet based communications based upon whether the other user's device has access to cellular based communications, WiFi communications, and/or the particular signal strength related to a particular mode of communications.

In some embodiments, the network status information is accessible for devices that are correlated with a contact or user that is stored on a communication device and/or a SIM device associated with the communication device. As used herein, the term "communication device" may refer to an electronic device used for communications. As such, in some embodiments, a cellular phone, a smart phone, a notebook computer, a tablet computer, a land based telephone, or the like may be referred to as a communication device.

In some embodiments, the network status information is collected for a particular user's device based upon a selection of that user from a contact listing. Thus, prior to attempting to communicate with a particular contact, it may be known if the contact is may be contact and what form of communication may be best suited to the current network status of the device.

In some embodiments, the network status information may be network provider based in which case the network provider may periodically, or when prompted, send signal strength information to contacts to the communication devices. In other embodiments, the network status information may be handled by a third party. In such embodiments, software may be provided to the communication devices that periodically, or when prompted, reports signal strength to a third party server that collects and distributes status information. In some embodiments, the software may be provided to the device as an app that may be obtained through an online store. The app may allow for phone from several operating systems and/or networks to all see each others' signal strength and status. In still other embodiments, the devices may be configured to obtain network status information in a peer-to-peer manner by contacting the other devices and asking about its network status. In some embodiments, this may be performed via short message service (SMS) or other similar service that may operate without a user's knowledge. Such embodiments would not require support from the network provider as long as each device was provided with appropriate software.

In some embodiments, location information may also be provided. In particular, location awareness resolution may be provided. The location awareness resolution may be an indication of the ability to pinpoint the location of a contact. As such, the location awareness resolution may be indicative of the signal strength of a location determinative network or technology, such as GPS, with a device. This location awareness resolution may be useful in a number of scenarios. For example, the location awareness indicator provides the user with information to know if the contacts device may be located and pinpointed so that the location of the contact may be known.

Turning to the drawings and referring initially to FIG. 1, a communication network 100 is illustrated that allows for communications between communication devices 102, 104. In particular, the illustrated network 100 may represent a cellular communication network that includes antennas 106, 108 with which the communication devices 102, 104 may transmit and receive communications. The antennas 106, 108 are communicatively coupled into a network 110 through which communications from the devices 102, 104 are routed to arrive at their destinations.

The network 100 may be configured to obtain information about the device 102, 104 using the network. In particular, the network 100 may be configured to procure a network signal strength attained by the devices 102, 104. The network signal strength may generally represent the strength of a signal received by the device from a network antenna 106,108 and vice-versa.

In some embodiments, the signal strength may be represented by a number of bars, a number, a fraction, a percentage, or other suitable representation indicative of the signal strength. As may be appreciated, certain conditions and/or locations may cause the signal strength to diminish. In some instances, the signal strength may be too weak to receive and/or maintain a particular type of communication. In some embodiments, the network 100 may be configured to provide network signal strength information of particular devices to other devices that may attempt to contact them to enable the other device or a user of the other device to determine if a particular mode of communication may be preferable.

In some embodiments, the network 100 may also be configured to determine a mode(s) of communication for which a particular device is available. For example, the network 100 may be configured to determine if the device 104 is available for communications over a cellular network (e.g., an Edge network, a 3G network, a 4G network, and so forth), an Internet connection (e.g., via a WiFi network, local area network, and so forth). This information may also or alternatively be provided to other users of the network.

Figure 2:
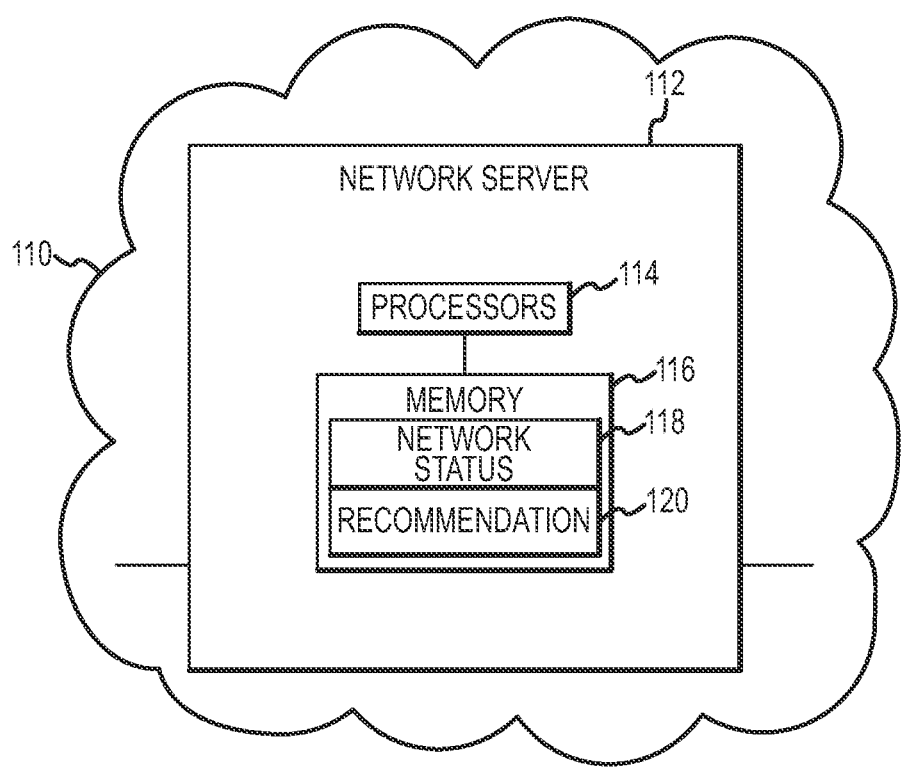
FIG. 2 is a block diagram illustrating an example network server of the wireless network of FIG. 1 having programs to allow for exchange of network status information between devices of the network.

FIG. 2 is a block diagram of an example network server 112. The network server 112 may be communicatively coupled into the network 100 and configured to obtain and provide network status information. The network server 112 may include one or more processors 114 and a memory 116 coupled to the processors. The memory 116 may include programs and/or software for obtaining and providing network status information to and from devices communicating across the network 100. For example, the memory 116 may include a network status program 118 that is executable by the processors 114 to obtain the status of a device and provide the status to another device. In some embodiments, the network server 112 may be configured to provide a mode of communication recommendation upon obtaining network status information and, as such, may include the memory 116 may include a recommendations program 120.

It should be appreciated that, in some embodiments, the network server 112 may be operated by a network provider, in which case the network status and recommendations programs 118, 120 may be provided within a server already installed within the network. In other embodiments, the network status and recommendations programs 118, 120 may be implemented by a third party. Thus, a third party server may be implemented that collects network status data and allows devices to access network status data for other devices.

Figure 3:
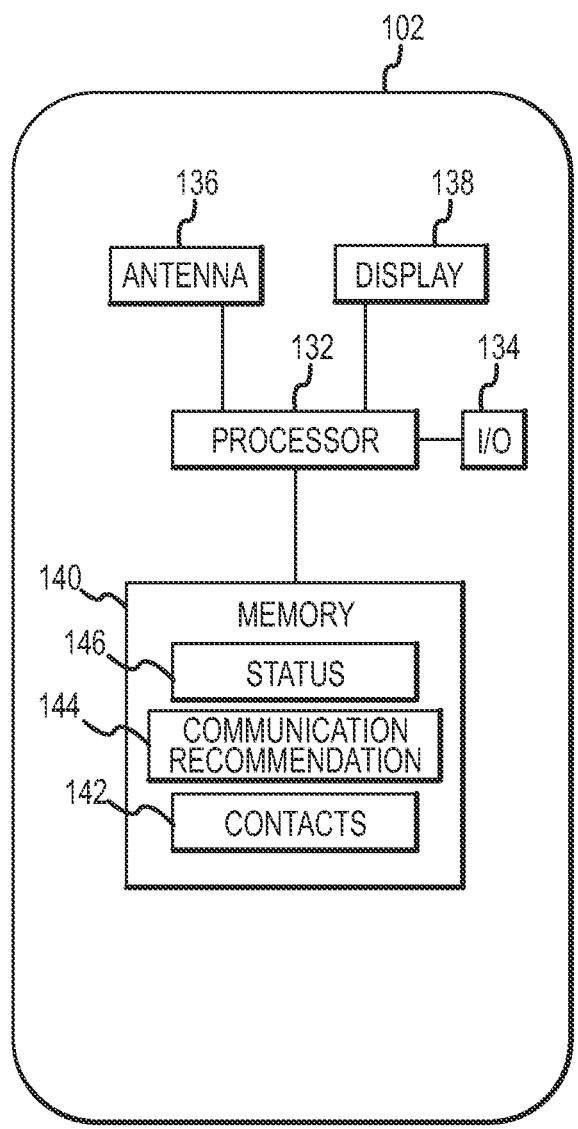
FIG. 3 is a block diagram of an example wireless communication device of FIG. 1.

FIG. 3 is a block diagram of the communication device 102 configured to provide network status information about other devices to a user. The communication device 102 includes a processor 132 to which other components are coupled. In particular, I/O ports 134, antennas 136, a display 138, and a memory 140 may be coupled to the processor 132. The I/O ports 134 may be configured to receive input and/or provide output to or from devices integral to or otherwise coupleable to the device 130. The antennas 134 may include one or more antennas configured to transmit and/or receive signals wirelessly. In some embodiments, the antennas 134 may include an antenna for cellular communications and an antenna for WiFi communications. The display 138 may be configured to provide a visual output to a user. In some embodiments, the display 138 may be implemented in the form of a liquid crystal display (LCD), an organic light emitting diode (oLED) display, or other display technology. In some embodiments, the display 138 may be implemented as a touch screen display.

The memory 140 may store instructions executable by the processor 132 to provide and/or obtain network status information. In particular, in some embodiments, the memory 140 may store programs related to providing network status information of the device 102 to the network server 112 or to another device, such as communication device 104. Additionally, the device 102 may be configured to obtain network status information of other devices. The network status information of the other devices may be displayed or provided to a user of the device 102. In some embodiments, the memory 140 may store contacts 142 with which the status information may be correlated. In particular, the network status information may be displayed on the display 138 in proximity of a contact listing to which it is correlated.

Additionally, in some embodiments, a communications recommendations program 144 may be executable by the processor 132 to evaluate the network status of a device and provide a recommendation as to a preferred mode of communication with that particular device.

In some embodiments, a network status program 146 may also be stored in the memory 140 and executable by the processor 132. In some embodiments, the network status program 146 may be configured to periodically transmit and/or receive network status information. The transmitted network status information represents the device's 102 current signal strength and type of communication so that other users and device may be able to know the device's network status.

Figure 4:
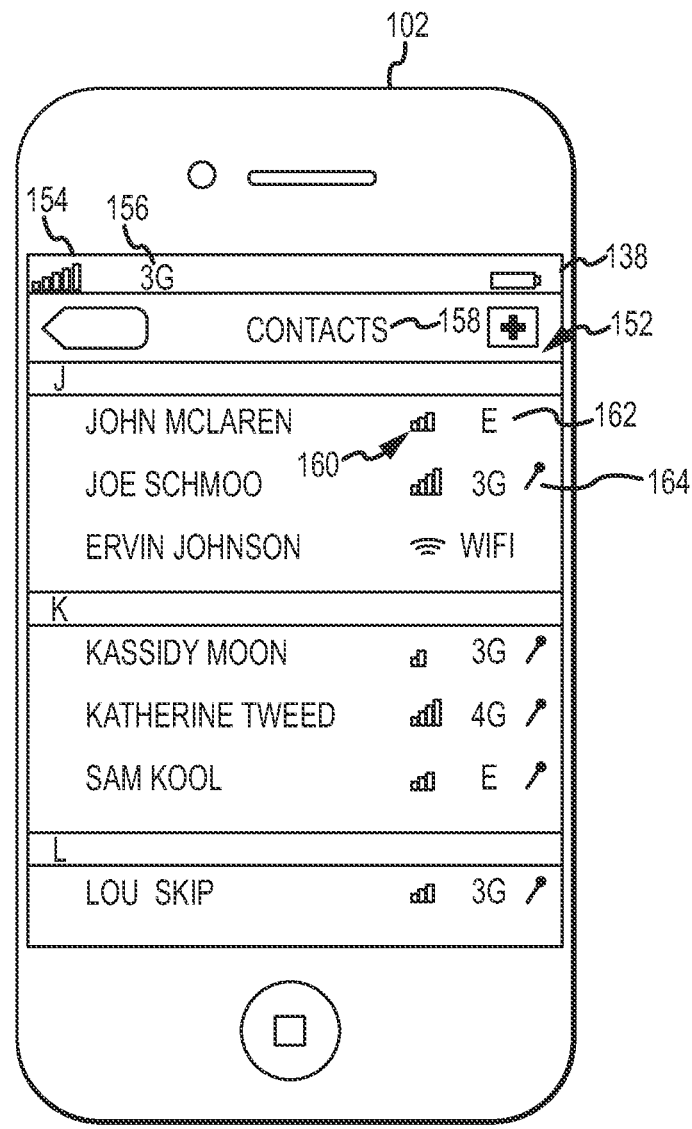
FIG. 4 illustrates an example user interface of a contacts page shown on a display of the wireless communication device of FIG. 3, with each contact having a corresponding network status displayed.

FIG. 4 illustrates an example user interface 152 shown on the display 138 of the device 102. The user interface 152 may show a signal strength indicator 154 for the device 102 and the type of network connection 156, among other things. The user interface 152 is on a contacts listing page 158. The contacts listing page 158 provides a listing of contacts that the user of the device 102 has loaded or saved onto the device 102. The contacts may be organized in a generally alphabetical order or other suitable manner. Next to each contact, a network status is provided. In particular, a network signal strength 160 and/or type of network connection 162 is displayed. Thus, a user is able to view the network status of contact's devices and determine the possibility of communicating with the contact and/or if particular type of communication may be preferable.

Additionally, a location awareness indicator 164 may be provided. The location awareness indicator 164 may indicate that the device "knows" its location or that its location may be determined. That is, the location awareness indicator 164 may indicate that the device has sufficient contact with a location determinative network or communication channel that its location may be determined. In some embodiments, the location information may be obtained from a global positioning system. In other embodiments, the location information may be obtained from other sources, such as a particular network with which the device is communicating. In some embodiments, the location awareness indicator 164 may provide an indication of the GPS signal strength or a metric of location awareness resolution, as discussed below with respect to FIG. 9.

Figure 5:
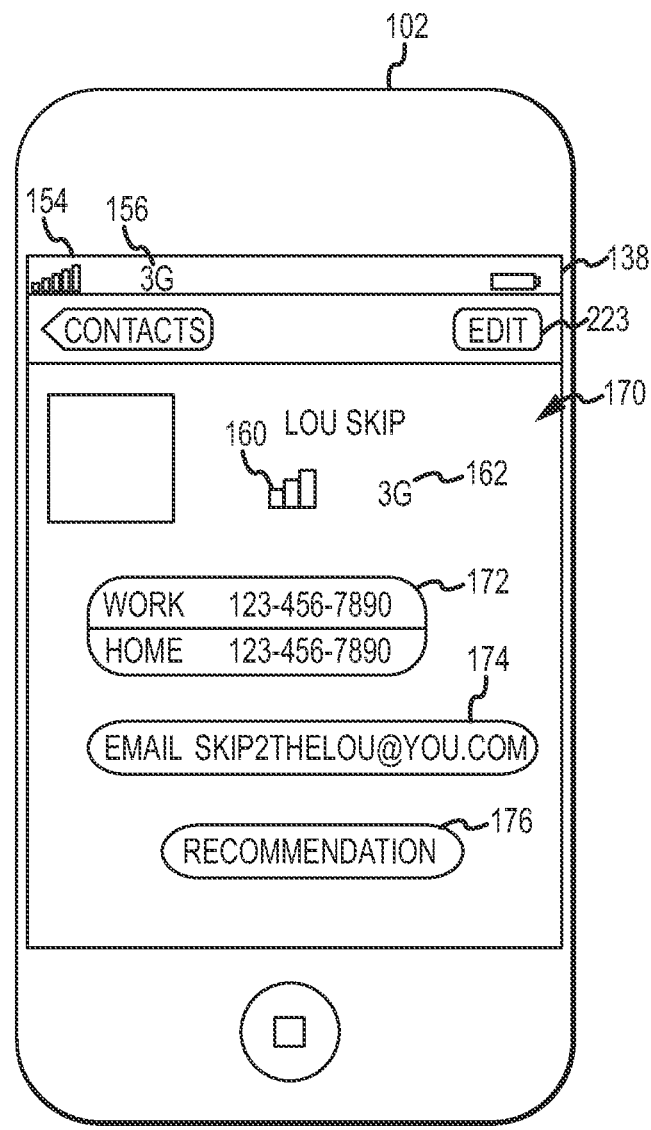
FIG. 5 illustrates a particular contact's page in the example user interface of FIG. 4 with a network status and a communication recommendation displayed.

In some embodiments, when a user selects a contact, such as the "Lou Skip" contact, Lou Skip's contact page 170 is displayed, as shown in FIG. 5. This contact page may again show the Lou Skip's network status with signal strength 160 and mode of communication 162. Additionally, contact information, such as phone numbers 172, email address 174, and so forth may be shown. In some embodiments, the device 102 may be configured to provide a recommendation to the user with respect to the particular mode of communication for reaching Lou Skip. In some embodiments, contact modes other than the recommended mode may be grayed-out or inaccessible. In other embodiments, a preferred contact mode may be highlighted or bolded. In other embodiments, a recommendation button 176 may be provided for selection by the user. Upon selection, a communication is initiated in the recommended mode. In other embodiments, the recommendation may be listed in a particular location on the display, such as above other communication modes. Additionally, in some embodiments, a listing of possible communication modes may be listed hierarchically based on a first recommendation, a second recommendation and so forth.

Figure 6:
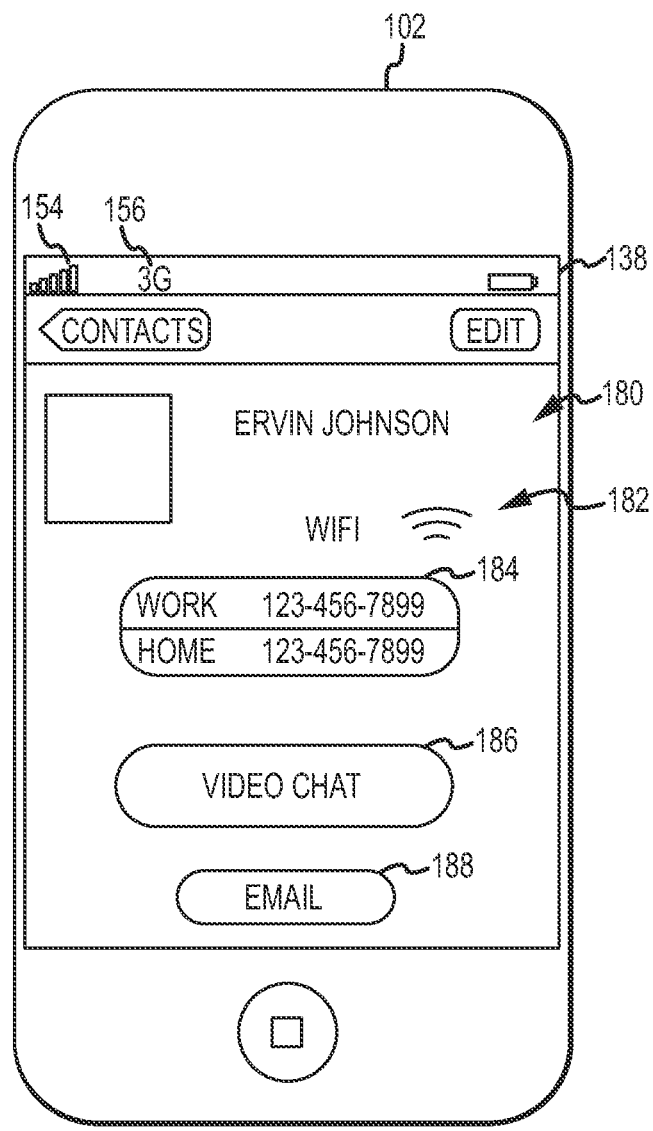
FIG. 6 illustrates another particular contact's page in the example user interface of FIG. 4 with a recommendation enlarged.

FIG. 6 illustrates another example contact page 180. In particular, FIG. 6 shows the contact page 180 for Ervin Johnson. Ervin's contact page 180 indicates the network status 182 as not including a cellular connection but, rather, a WiFi connection. Although, phone numbers 184 are listed for reaching Ervin, a recommended mode of communication (e.g., video chat 186) may be enlarged to indicate that it is a preferred mode of communication. A secondary recommendation may also be provided (e.g., email 188) that is located below the primary recommendation and in a smaller format.

In some embodiments, the unavailability of a particular type of communication may be indicated by graying out the particular type of communication. In other embodiments, only available communication types may be displayed or icons related thereto. In still other embodiments, a color coding scheme may be implemented to indicate recommendations. For example, a color coding scheme using green, yellow and red may be implemented to indicate how well types of communication might function, with green indicating a good choice for communications and red indicating a poor choice.

In some embodiments, signal levels may be simplified into "availability" for various types of communication based on signal strength and network status. The thresholds for availability could be set as a default, such as three bars for cellular phone calls, for example. In some embodiments, the thresholds may be user adjustable.

In addition, in some embodiments, filters may be applied to a contacts list based on the type of communications available. That is, for example, a filter may be applied to only show those contacts with whom a video chat may be conducted, or those to whom a phone call would not likely be dropped based on their signal strength.

It should also be appreciated that the network status of the device that will initiate the communication may be accounted for when providing a recommendation. Thus, if the initiating device has a relatively low signal strength, a text message may be suggested rather than other forms of communications.

Figure 7:
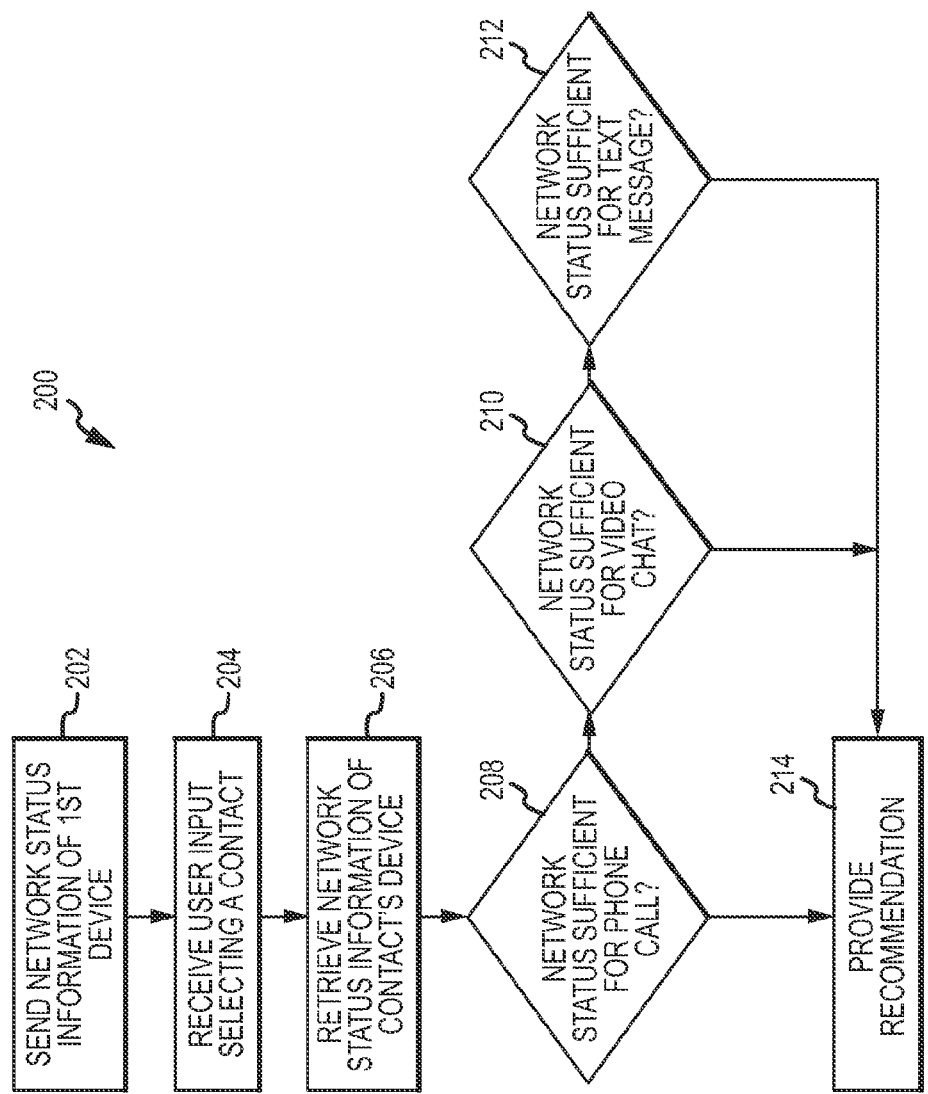
FIG. 7 is a flow chart illustrating a method for providing a recommended mode of communication based on network status.

FIG. 7 is a flowchart illustrating an example method 200 for providing a recommendation in accordance with an example embodiment. The method 200 may begin with a first device sensing a network status of the first device so that other devices may be aware of its current network status (Block 202). In other embodiments, the sending of network status of the first device may not be include in the method.

The first device may receive user input selecting a contact (Block 204) and a network status of the contact's device may be retrieved (Block 206). In some embodiments, the network status of a contact may be retrieved periodically, such that it is known prior to selection of the contact by a user. Once the network status of the contact's device is known, a sequential inquiry is performed to determine the recommendation. For example, in some embodiments, it is determined if the network status is sufficient for a phone call (Block 208), for a video chat (Block 210), or for a text message (Block 212). Upon a determination that the network status is sufficient for a particular mode of communication, a recommendation may be provided (Block 214).

It should be appreciated, that in other embodiments, the sequence of the inquiry may be changed. For example, it may initially be determined if the network status is sufficient for video chat and then subsequently if it is sufficient for a phone call. In some embodiments, the sequence may be user configurable based on a users communication preferences for a particular contact or for all contacts. Moreover, a recommendation may be non-exclusive, in some embodiments. In particular, the device may be configured to provide multiple recommendations based on the network status.

Figure 8:
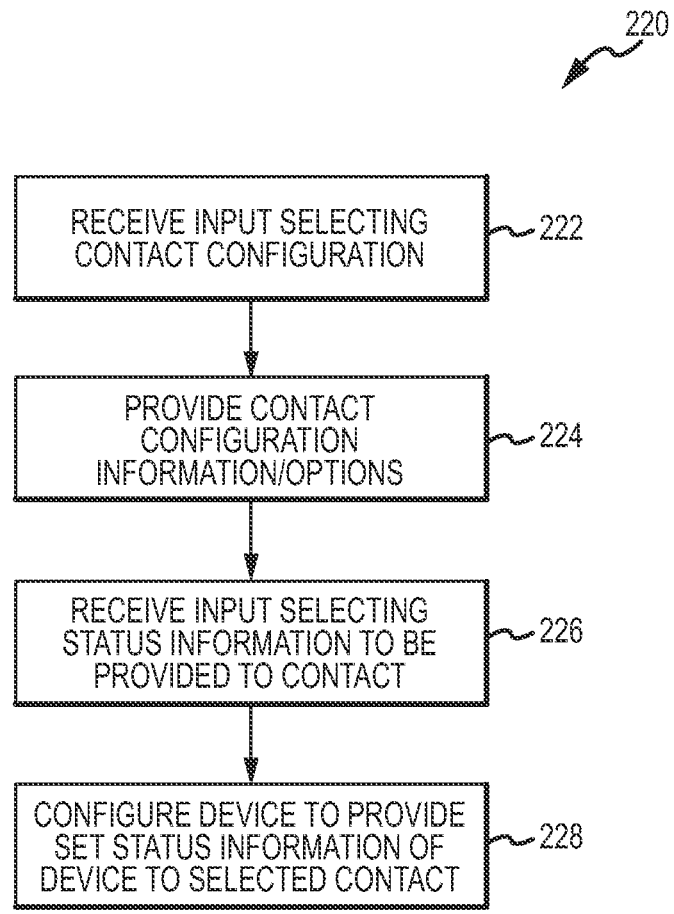
FIG. 8 is a flow chart illustrating a method for configuring a device to provide a set network status rather than an actual network status.

FIG. 8 is a flowchart illustrating a method 220 allowing a user to set a network status for a device. That is, the method 220 provides for manually setting a network status. This may be useful if, for example, the user does not want to be contact via certain modes or by certain contacts only via certain modes of communication.

The method may begin by receiving user input selecting a configuration for a contact (Block 222). For example, a user may select the edit button 223 on Lou Skip's contact page 170. The device then provides to the user contact configuration information and/or options (Block 224). The device may receive user input selecting a particular status information to be provided to the contact (Block 226). Upon selection by the user, the device is configured to provide the set status information to the selected contact (Block 228).

Figure 9:
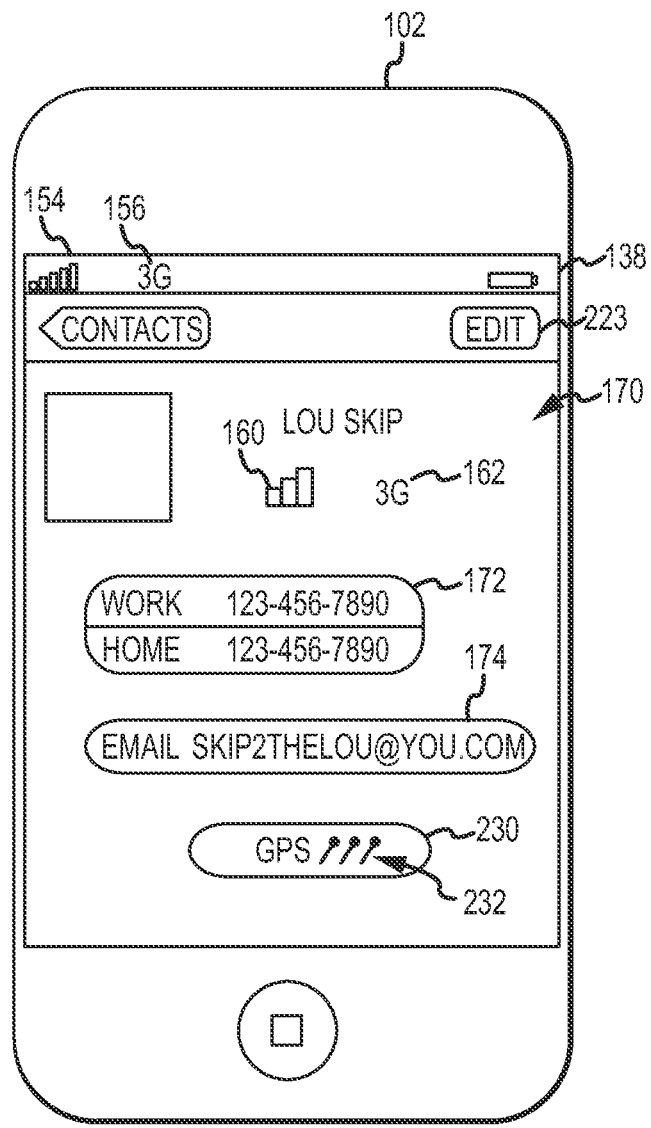
FIG. 9 illustrates the contact page of FIG. 6 having a location awareness resolution indicator.

FIG. 9 illustrates a contact page 170 having a location awareness resolution indicator. As may be noted, the contact page 170 is the same as that shown in FIG. 6 except for the recommendation 176 has been replaced with an indication of location awareness resolution 230 for the device of the contact. In some embodiments, the location awareness resolution 230 may be indicated by a number of icons 232 displayed. For example, if four icons 232 are displayed, the location resolution may be good, whereas if fewer than four are displayed the resolution may diminish. In some embodiments, the number of icons indicate the signal strength with a particular location determinative technology, such as GPS. In some embodiments, a time stamp (not shown) may be provided to indicate the most recent moment when location information was available. The location awareness resolution 230 may be presented as a virtual button that when selected provides a map page with pinpoint location information for the contact.

In some embodiments, the location awareness information may be used in conjunction with the network status information in providing the communication recommendation. For example, if the location information indicates that the contact may be at home or in the office, a landline communication may provide more reliable service than a wireless communication mode. As such, the recommendation would indicate the landline, if available and known.

In some embodiments, the selection of a particular status information to be provided to a contact may help to filter out unwanted types of communications. For example, based on the status information provided to the contact the contact may not attempt to contact the user of the device via a telephone call or via video chat, but only via text or email.

The foregoing describes some example embodiments for providing, receiving and making use of network status information for an electronic device. Although specific embodiments were presented, persons skilled in the art will recognize that changes may be made in form and detail without departing from the spirit and scope of the embodiments. For example, although the examples were presented with respect to wireless devices, the techniques may equally be applied to wired devices that are communicating with wired devices. Furthermore, generally the signal strength of a single technology was generally displayed on the contacts page, however, in some embodiments all communication technologies available for a particular contact may be shown with their respective signal strength. Accordingly, the specific embodiments described herein should be understood as examples and not limiting the scope of the disclosure.

The invention claimed is:

1. A method of operating an electronic communication device comprising:
   retrieving a network status of another communication device, the network status comprising a signal strength;
   determining, using a processor, an available communication mode based at least in part upon the retrieved network status;
   providing a recommended communication mode based at least in part upon the retrieved network status.

2. The method of claim 1 further comprising providing a network status to the other communication device.

3. The method of claim 1, wherein the network status further comprises a type of network.

4. The method of claim 3, wherein providing a recommended communication mode comprises:
   determining if the signal strength of the other device and the type of network of the other device will support a particular mode of communication;
   determining if the electronic communication device supports the particular mode of communication; and
   if both the electronic communication device and the other device supports the particular mode of communication, providing the particular mode of communication as the recommended mode of communication.

5. The method of claim 1 further comprising:
   receiving a user input to configure a contact;
   providing the user with contact configuration options;
   receiving input selecting status information to be provided to the contact; and
   providing the selected status information to the contact.

6. The method of claim 1 wherein providing the recommended mode of communication comprises displaying the recommended mode of communication in at least one of: in a larger font size, above other listed communication modes, with a distinguishing color, or exclusive of other communication modes.

7. The method of claim 1 further comprising determining and providing a location awareness indicator for the other device, wherein the location awareness indicator comprises a metric of the ability of the other device to identify its location.

8. A communication device comprising:
   a processor;
   a memory coupled to the processor, the memory storing one or more sets of communication contacts, wherein the communication device is configured to procure a signal strength and type of network available for the one or more sets of communication contacts; and
   a display coupled to the processor and configured to display the signal strength and type of network available for the one or more sets of communication contacts on the display.

9. The communication device of claim 8, wherein the processor is configured to provide a recommended communication mode to a user upon selection of a particular contact of the one or more sets of communication contacts.

10. The communication device of claim 9 further comprising one or more antennas for wireless communications, wherein the recommended communication mode is via a wireless communication standard.

11. The communication device of claim 10, wherein the one or more antennas comprises at least one antenna for cellular communications.

12. The communication device of claim 10, wherein the one or more antennas comprises an antenna for WiFi communications.

13. The communication device of claim 10, wherein the processor is configured to determine a location awareness resolution for the one or more sets of communication contacts and the display is configured to display the location awareness resolution.

14. A communications network comprising:
- a plurality of antennas configured to transmit and receive wireless communications from communication devices;
- a communications network linking the plurality of antennas communicatively;
- a network server coupled into the communications network configured to obtain network status information for communication devices utilizing the communications network, wherein the network status information comprises a signal strength indication and a type of network indication.

15. The communications network of claim 14, wherein the network server is configured to provide network status information of the communication devices.

16. The communications network of claim 14, wherein the network server is configured to provide a recommended communication mode to a communication device attempting to initiate communications with another communication device utilizing the communications network, wherein the recommended communication mode is provided based upon the network status of at least one of the communication device and the other communication device.

17. The communications network of claim 14 wherein the network server is configured to provide a false network status of a communication device based upon a user's configuration.

18. A method of operating a communications device comprising:
- receiving network status information indicating at least a network signal strength of a plurality of communication contacts stored on the communications device;
- filtering the plurality of communication contacts based at least in part upon the communication contact ability to communicate in a particular mode, wherein the network status information is indicative of ability to communicate in the particular mode of communication; and
- displaying a listing of the filtered communication contacts.

19. The method of claim 18 further comprising providing a recommended mode of communication for each communication contact.

20. The method of claim 18 further comprising providing a network status of the communications device to another communications device.

21. The method of claim 20 wherein providing the network status of the communications device comprises providing a set network status, rather than an actual network status.

* * * * *